US008051668B2

(12) United States Patent
Singh et al.

(10) Patent No.: US 8,051,668 B2
(45) Date of Patent: Nov. 8, 2011

(54) CONDENSER FAN CONTROL SYSTEM

(75) Inventors: Abtar Singh, Kennesaw, GA (US);
Thomas J. Mathews, Fayette, ME (US);
Frank C. Brown, III, Blacksburg, VA (US); Ozgur Y. Gurkan, Kennesaw, GA (US)

(73) Assignee: Emerson Retail Services, Inc., Kennesaw, GA (US)

( * ) Notice: Subject to any disclaimer, the term of this patent is extended or adjusted under 35 U.S.C. 154(b) by 1022 days.

(21) Appl. No.: 11/260,877

(22) Filed: Oct. 27, 2005

(65) Prior Publication Data

US 2006/0112703 A1 Jun. 1, 2006

Related U.S. Application Data

(60) Provisional application No. 60/623,148, filed on Oct. 28, 2004.

(51) Int. Cl.
*F25D 17/00* (2006.01)
(52) U.S. Cl. ............... 62/181; 62/183; 62/126; 62/129; 62/230; 700/276; 700/282; 702/61; 702/130
(58) Field of Classification Search .............. 62/181, 62/183, 126, 129, 230; 700/276, 282; 702/61, 702/130
See application file for complete search history.

(56) References Cited

U.S. PATENT DOCUMENTS

| 5,040,377 | A | | 8/1991 | Braun et al. |
| 5,735,134 | A | | 4/1998 | Liu et al. |
| 5,740,679 | A | * | 4/1998 | Ueno et al. ............. 62/175 |
| 6,257,007 | B1 | | 7/2001 | Hartman |
| 6,637,229 | B1 | * | 10/2003 | Forrest et al. ............ 62/230 |
| 7,246,500 | B2 | | 7/2007 | Singh et al. |
| 2003/0005710 | A1 | * | 1/2003 | Singh et al. ............. 62/129 |
| 2003/0074908 | A1 | * | 4/2003 | Baker ................... 62/183 |
| 2006/0130501 | A1 | * | 6/2006 | Singh et al. ............. 62/183 |
| 2007/0256437 | A1 | | 11/2007 | Singh et al. |

FOREIGN PATENT DOCUMENTS

| JP | 2003237360 A | 8/2003 |
| JP | 2004044868 A | 2/2004 |

OTHER PUBLICATIONS

First Examination Report dated Aug. 20, 2009 received from the Australian Government, IP Australia regarding Australian Patent Application No. 2005302419.
Office Action dated Mar. 1, 2010 for U.S. Appl. No. 11/827,411.
Response to Office Action and Terminal Disclaimer regarding U.S. Appl. No. 11/827,411 dated Jun. 1, 2010.

(Continued)

*Primary Examiner* — Frantz Jules
*Assistant Examiner* — Azim Rahim
(74) *Attorney, Agent, or Firm* — Harness, Dickey & Pierce, P.L.C.

(57) ABSTRACT

A controller comprises a first input that receives a signal indicating an energy consumption value of a compressor, a second input that receives a signal indicating an energy consumption value of a condenser fan, and an output that provides a control signal to the condenser fan. The controller also comprises a memory that stores a condenser set point, and a processor in communication with the input, output and memory and that modulates the condenser set-point to minimize energy consumption and controls the condenser fan based on the condenser set-point.

9 Claims, 5 Drawing Sheets

OTHER PUBLICATIONS

IP Australia Examiner's Report regarding Australian Patent Application 2005302420, dated Aug. 7, 2009.
International Preliminary Report on Patentability regarding International Application No. PCT/US2005/039022, dated May 1, 2007.
Written Opinion of the International Searching Authority regarding International Application No. PCT/US2005/039022, dated Dec. 6, 2006.
Non-Final Office Action dated Jun. 30, 2006 for U.S. Appl. No. 11/260,878.
Non-Final Office Action dated Oct. 5, 2006 for U.S. Appl. No. 11/260,878.
Extended European Search Report regarding Application No. 05825061.4-2301, dated Nov. 19, 2010.

* cited by examiner

CONDENSER FAN CONTROL SYSTEM

CROSS-REFERENCE TO RELATED APPLICATIONS

This application claims the benefit of U.S. Provisional Application No. 60/623,148 filed on Oct. 28, 2004. The disclosure of the above application is incorporated herein by reference.

FIELD

The present teachings relate to refrigeration systems and, more particularly, to a refrigeration system controller.

BACKGROUND

Refrigerated and frozen food product travels from processing plants to retailers, where the food product remains on display case shelves for an additional period of time. In general, the display case shelves are part of a refrigeration system for storing and displaying the refrigerated and frozen food product, which should be constantly cooled to ensure maximum product life. In the interest of efficiency, retailers attempt to maximize the shelf-life and quality of the stored food product while concurrently maximizing the efficiency of the refrigeration system. In so doing, retailers receive a profit through sales of quality products while minimizing spending on energy costs associated with product display (i.e., refrigeration, etc.).

The refrigeration system plays a key role in controlling the quality of the food product. Thus, any breakdown in the refrigeration system or variation in performance may cause food quality issues. Thus, it is important for the retailer to monitor the equipment of the refrigeration system to ensure it operates at expected levels.

Refrigeration systems generally require a significant amount of energy to operate. Therefore, energy requirements are a significant cost to retailers, especially when compounding energy uses across multiple retail locations. As a result, it is in the best interest of retailers to closely monitor performance of their refrigeration systems to maximize efficiency and reduce operational costs.

Monitoring refrigeration system performance and energy consumption are tedious and time-consuming operations. Generally speaking, retailers lack the expertise to accurately analyze time and temperature data and relate that data to food-product quality, as well as the expertise to monitor the refrigeration system for performance and efficiency. For example, retailers typically set refrigerated display cases at lower than necessary temperatures to protect against a breakdown or stoppage of the refrigeration system. The cooler temperatures keep the food product on display therein at a lower temperature, and thus, allow the retailer more time to repair the refrigeration system before the food product may spoil.

Decreasing the temperature of the food product translates directly into an increase in energy consumption as refrigeration components such as compressors, evaporator fans, and condenser fans draw more energy to reduce the temperature within the display case. As can be appreciated, consuming more energy results in higher energy costs. Because the increase in energy consumption does not necessarily lead to an improvement in the quality or safety of the food product itself, retailers cannot typically pass this additional cost to their customers and thus lose profit.

SUMMARY

A controller comprising a first input, a second input, an output, a memory and a processor is provided. The first input receives a signal indicating an energy consumption value of a compressor. The second input receives a signal indicating an energy consumption value of at least one condenser fan. The output provides a control signal to the condenser fan. The memory stores a condenser set-point. The processor is in communication with the input, output and memory and modulates the condenser set-point to minimize energy consumption. The processor controls the condenser fan based on the condenser set-point.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, its application, or uses. As used herein, the terms module, control module, and controller refer to an application specific integrated circuit (ASIC), an electronic circuit, a processor (shared, dedicated, or group) and memory that execute one or more software or firmware programs, a combinational logic circuit, and/or other suitable components that provide the described functionality. Further, as used herein, computer-readable medium refers to any medium capable of storing data for a computer. Computer-readable medium may include, but is not limited to, CD-ROM, floppy disk, magnetic tape, other magnetic medium capable of storing data, memory, RAM, ROM, PROM, EPROM, EEPROM, flash memory, punch cards, dip switches, or any other medium capable of storing data for a computer.

Figure 1:
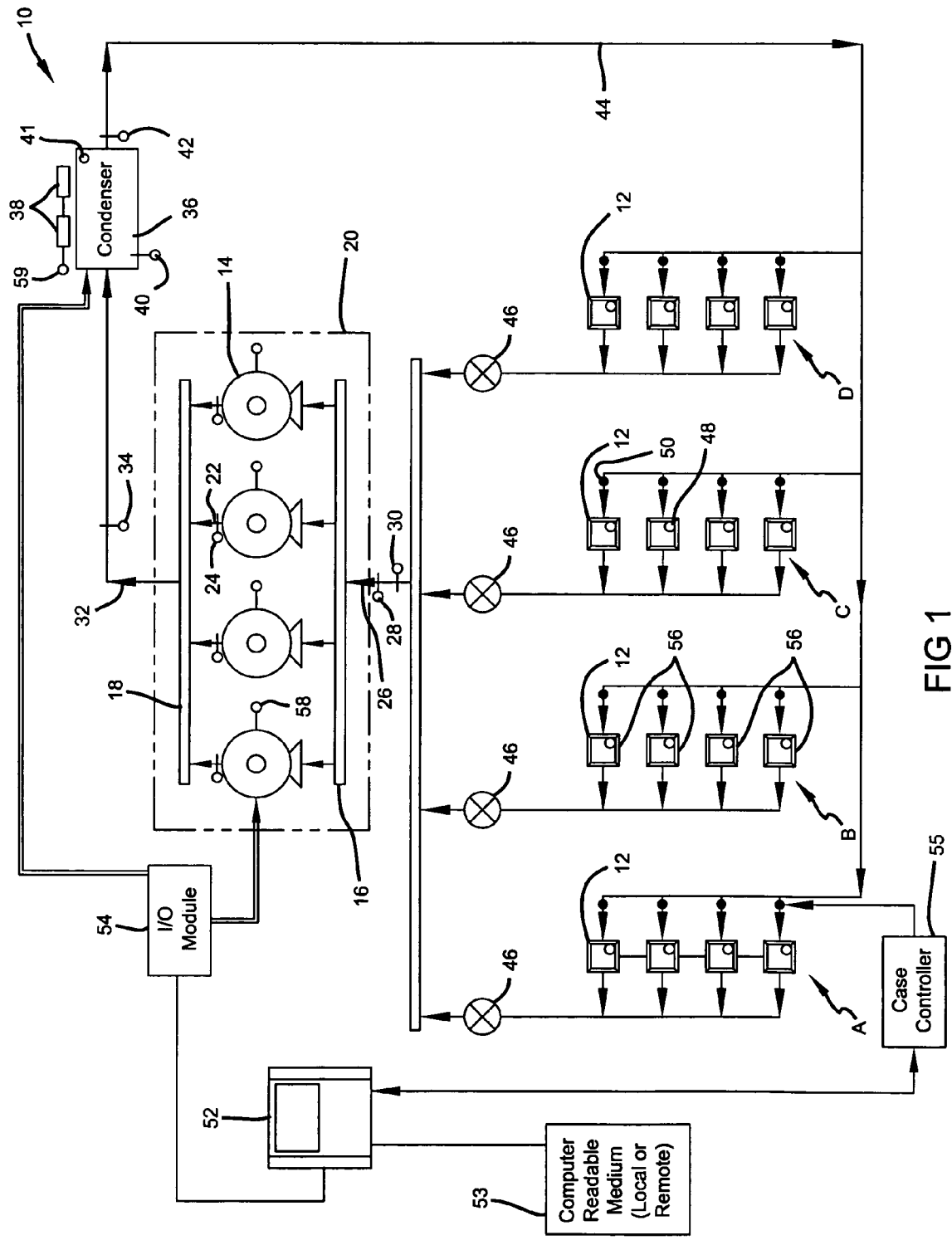
FIG. 1 is a schematic illustration of an exemplary refrigeration system.

With reference to FIG. 1, an exemplary refrigeration system 10 includes a plurality of refrigeration cases 12, as well as a plurality of compressors 14 piped together with a common suction manifold 16 and a discharge header 18 all positioned within a compressor rack 20. A discharge output 22 of each compressor 14 includes a respective compressor temperature sensor 24. An input 26 to the suction manifold 16 includes both a suction pressure sensor 28 and a suction temperature sensor 30. Further, a discharge outlet 32 of the discharge header 18 includes an associated compressor discharge pressure sensor 34. As described in further detail hereinbelow, the various sensors are implemented for evaluating energy requirements for the refrigeration system 10.

The compressor rack 20 compresses refrigerant vapor that is delivered to a condenser 36 where the refrigerant vapor is liquefied at high pressure, thereby rejecting heat to the outside air. Condenser fans 38 are associated with the condenser 36 to enable improved heat transfer from the condenser 36. The condenser 36 includes an associated ambient temperature sensor 40, a condenser temperature sensor 41, and a condenser discharge pressure sensor 42. This high-pressure liquid refrigerant is delivered to the plurality of refrigeration cases 12 by way of piping 44. Each refrigeration case 12 is arranged in separate circuits consisting of a plurality of refrigeration cases 12 that operate within a certain temperature range.

FIG. 1 illustrates four circuits labeled circuit A, circuit B, circuit C, and circuit D. Each circuit is shown consisting of four refrigeration cases 12. However, those skilled in the art will recognize that any number of circuits, as well as any number of refrigeration cases 12 may be employed within a circuit. As indicated, each circuit will generally operate within a certain temperature range. For example, circuit A may be for frozen food, circuit B may be for dairy, circuit C may be for meat, etc.

Because the temperature requirement is different for each circuit, each circuit includes a pressure regulator 46 that acts to control the evaporator pressure and, hence, the temperature of the refrigerated space in the refrigeration cases 12. The pressure regulators 46 can be electronically or mechanically controlled. Each refrigeration case 12 also includes its own evaporator 48 and its own expansion valve 50 that may be either a mechanical or an electronic valve for controlling the superheat of the refrigerant. In this regard, refrigerant is delivered by piping 44 to the evaporator 48 in each refrigeration case 12.

The refrigerant passes through the expansion valve 50 where a pressure drop causes the high pressure liquid refrigerant to achieve a lower pressure combination of liquid and vapor. As hot air from the refrigeration case 12 moves across the evaporator 48, the low pressure liquid turns into gas, thereby removing heat from the case. This low pressure gas is delivered to the pressure regulator 46 associated with that particular circuit. At the pressure regulator 46, the pressure is dropped as the gas returns to the compressor rack 20. At the compressor rack 20, the low pressure gas is again compressed to a high pressure gas, which is delivered to the condenser 36. The condenser 36 creates a high pressure liquid to supply to the expansion valve 50 to start the refrigeration cycle again.

A controller 52 is used and configured or programmed to control the operation of the refrigeration system 10. The controller 52 is preferably an Einstein Area Controller offered by CPC, Inc. of Atlanta, Ga., or any other type of programmable controller that may be programmed, as discussed herein. The controller 52 operates according to computer executable instructions contained on a computer-readable medium 53. The computer-readable medium 53 may be either local or remote to the refrigeration system 10. The controller 52 controls the bank of compressors 14 in the compressor rack 20, as well as the condenser 36 and condenser fans 38, via an input/output module 54, or I/O module 54. The I/O module 54, or I/O Module 54, has relay switches to turn the compressors 14 on and off to provide the desired suction pressure and to drive the condenser fans 38 at an optimum rate based on system performance. The system controller 52 may include a processor in communication with memory, such as RAM, ROM, EPROM, EEPROM, etc., that operate to control the condenser fans 38 and compressors 14. Operating data, such as a condenser set-point, may be stored by the system controller 52 in memory.

A separate case controller 55, such as a CC-100 case controller, also offered by CPC, Inc. of Atlanta, Ga. may be used to control the superheat of the refrigerant to each refrigeration case 12, via an electronic expansion valve in each refrigeration case 12 by way of a communication network or bus. A mechanical expansion valve may be used in place of the separate case controller 55. Should separate case controllers 55 be utilized, the main refrigeration controller 52 may be used to configure each separate case controller, also via the communication bus. The communication bus may either be a RS-485 communication bus or a LonWorks Echelon bus that enables the controller 52 and the separate case controllers 55 to receive information from each refrigeration case 12.

Each refrigeration case 12 may have a temperature sensor 56 associated therewith, as shown for circuit B. The temperature sensor 56 can be electronically or wirelessly connected to the controller 52 or the expansion valve for the refrigeration case 12. Each refrigeration case 12 in the circuit B may have a separate temperature sensor 56 to take average/min/max temperatures or a single temperature sensor 56 in one refrigeration case 12 within circuit B may be used to control each refrigeration case 12 in circuit B because all of the refrigeration cases 12 in a given circuit operate at substantially the same temperature range. These temperature inputs are preferably provided to the I/O Module 54, which returns the information to the controller 52 via the communication bus.

Additional sensors are provided and correspond with each component of the refrigeration system and are in communication with the controller 52. A compressor current sensor 58 and a condenser fan current sensor 59 generate compressor and condenser fan current signals corresponding to the electrical current of each. The compressor and condenser fan current signals are received by the controller 52. Alternatively, electrical power meters may be used, in place of electrical current sensors, to generate signals corresponding to the electrical power, for example in kilowatt-hours, being used by the condenser 36 or compressors 14. As can be appreciated, other units can be used for the energy consumption measurements. Moreover, any other suitable energy sensing device may be used to monitor energy consumption of the refrigeration components. As can be further appreciated, any other suitable parameter corresponding to energy consumption may be used. For example, a control signal that directs the component to operate at a given level, such as a PID control signal. The control signal may direct the component to operate at a desired percentage of maximum operation. The controller 52 may calculate energy consumption based on the control signal and known characteristics of the component.

The energy consumption information is used by the controller 52 to optimize the performance of the refrigeration system 10 to ensure that a desired cooling capacity is provided in each refrigeration case 12 while consuming a minimum amount of energy. Specifically, the controller 52 monitors the energy consumption of the compressors 14 and the condenser fans 38 and controls condenser fan capacity to minimize the total energy consumption.

Condenser fan capacity refers to the cooling capacity of the condenser fans 38. If the condenser fans 38 are fixed-speed fans, then the controller 52 increases condenser fan capacity by turning one or more condenser fans 38 on, and decreases condenser fan capacity by turning one or more condenser fans 38 off. If the condenser fans 38 are variable-speed fans, then the controller 52 increases condenser fan capacity by increasing the speed of one or more condenser fans 38, and decreases condenser fan capacity by decreasing the speed of one or more condenser fans 38. The condenser 36 may have a combination of fixed speed and variable speed condenser fans 38.

The controller 52 optimizes total energy consumption by changing the condenser fan capacity and monitoring the corresponding change in total energy consumption. In this way, the controller 52 finds the optimal condenser fan capacity.

The controller 52 receives data from the respective temperature, pressure, and current sensors 24, 28, 30, 34, 40, 41, 42, 56, 58, 59. Specifically, the controller 52 receives: a suction pressure signal ($P_s$) generated by the suction pressure sensor 28, a suction temperature signal ($T_s$) generated by the suction temperature sensor 30, a compressor discharge pressure signal ($P_{D-Comp}$) generated by the compressor discharge pressure sensor 34, an ambient temperature signal (TA) generated by the ambient temperature sensor 40, a condenser temperature signal ($T_{Cond}$) generated by the condenser temperature sensor 41, a condenser discharge pressure signal ($P_{D-Cond}$) generated by the condenser discharge pressure sensor 42, and a condenser fan electrical current signal ($I_{Cond}$) generated by the condenser fan current sensor 59. Additionally, the controller 52 receives the compressor current signals from each of the compressor current sensors 58, and calculates a total compressor electrical current ($I_{Comp}$). Because temperature can be calculated based on pressure, not all of the above sensors are necessary. For example, the refrigeration system 10 may not include the condenser temperature signal. In such case, the controller 52 may calculate $T_{Cond}$ based on $P_{D-Cond}$.

Generally, when condenser fan capacity is increased, $P_{D-Cond}$ and PD-Comp decrease. When condenser fan capacity is decreased, $P_{D-Cond}$ and $P_{D-Comp}$ increase. When $P_{D-Comp}$ decreases, the load on the compressor 14 is decreased, and, consequently, $I_{Comp}$ decreases. At the same time, when condenser fan capacity is increased, $I_{Cond}$ also increases. The controller 52 adjusts condenser fan capacity to minimize the total energy consumption, i.e., $I_{Comp}+I_{Cond}$.

The controller 52 may deliberately allow an increase in the energy used by the condenser fans 36, in order to reduce the energy used by the compressors 14 by a larger amount. In this way, the system controller 52 optimizes the total power consumed by the compressors 14 and condenser fans 36.

Condenser fan capacity may be controlled by a set-point. For example, the set-point may be a condenser temperature set-point (Tsp). In such case, the controller 52 compares $T_{Cond}$ with Tsp. When $T_{Cond}$ is greater than Tsp, the controller 52 increases condenser fan capacity and when $T_{Cond}$ is less than Tsp, the controller 52 decreases condenser fan capacity. The set-point may also be a condenser pressure set-point (Psp). In such case, the controller 52 compares $P_{D-Cond}$ with Psp, and adjusts the condenser fan capacity as needed. Condenser fan control based solely on condenser temperature or pressure set-points does not account for varying ambient temperatures.

The set-point may also be a temperature difference set-point (TD). In such case, the controller 52 calculates a difference between $T_{Cond}$ and TA and compares the difference to TD. Condenser fan control based on TD accounts for varying ambient temperatures. $T_{Cond}$ is generally greater than TA. When the difference between $T_{Cond}$ and TA is less than TD, the controller 52 decreases condenser fan capacity. When the difference between $T_{Cond}$ and TA is greater than TD, the controller 52 increases fan capacity. Alternatively, the controller 52 may calculate a difference between the ambient temperature and a condenser discharge saturation temperature, which is calculated based on the $P_{D-Cond}$.

Traditional refrigeration systems operate based on a fixed set-point, i.e., fixed Tsp, Psp, or TD. In the traditional system, the set-point remains constant despite varying refrigeration system loads and varying operating conditions.

The controller 52 of the present teachings, on the other hand, modulates the condenser set-point to minimize total energy consumption. The controller 52 varies the condenser set-point to adjust for varying refrigeration system loads while minimizing total energy consumption. The system controller 52 may store the condenser set-point in memory accessible to the system controller 52.

The controller 52 may modulate the condenser set-point within a predetermined operating range, including condenser maximum and minimum temperatures. In this way, the controller 52 insures that $T_{Cond}$ does not rise above a condenser temperature maximum. For example, when TD is used as the condenser set-point, $T_{Cond}$ rises with TA. Thus, if TD is 10 degrees and TA is 80 degrees, the resulting $T_{Cond}$ may be 90 degrees. If TA rises to 90 degrees, the resulting $T_{Cond}$ may rise to 100 degrees. When $T_{Cond}$ reaches the condenser temperature maximum, the controller 52 may simply control condenser fan capacity to lower $T_{Cond}$, despite the TD set-point and the rising TA. Further, the controller 52 may check the condenser set-point against the condenser maximum and minimum temperatures each time the condenser set-point is modulated to insure the resulting $T_{Cond}$ will be within the range.

Because $T_{Cond}$ and $P_{D-Cond}$ may vary during operation, the pressure and temperature of the refrigerant delivered to the refrigeration cases 12 may also vary. The temperature of the refrigerated space in the refrigeration cases 12 is maintained, however, by operation of the pressure regulators 46 and the expansion valves 50.

Figure 2:
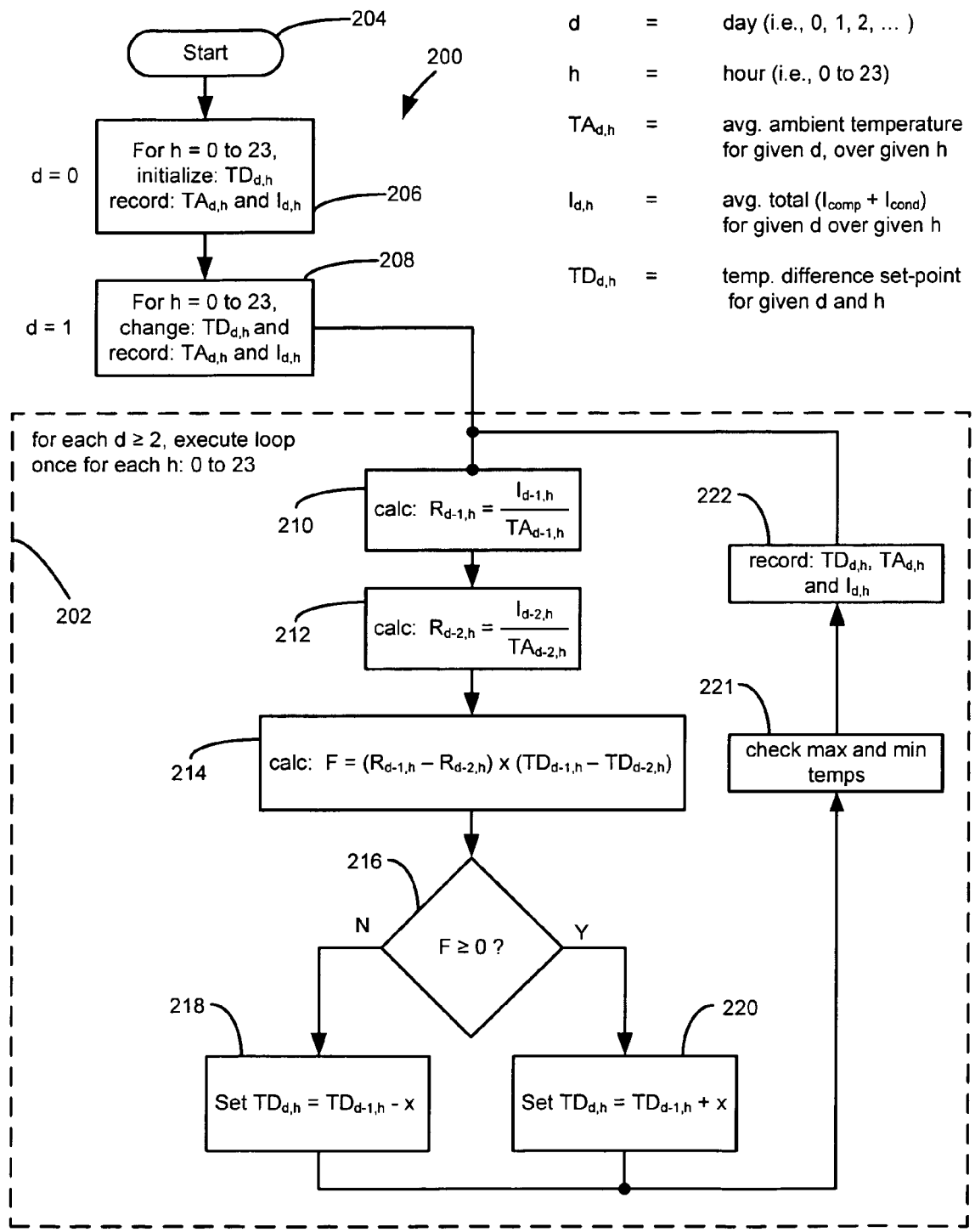
FIG. 2 is a flowchart illustrating a condenser fan control algorithm based on modulating a temperature difference set-point.

With reference to FIG. 2, a control algorithm 200 for optimizing condenser fan capacity based on energy consumption using a TD setpoint is executed by the controller 52. The control algorithm 200 is stored on the computer readable medium 53 accessible to the controller 52. The controller 52 includes time-keeping capabilities, such as a system clock, or the like. In this way, the controller 52 is able to monitor the current day and time.

The control algorithm 200 includes an iteration loop 202 that is executed based on daily and hourly time periods. As can be appreciated, other iteration loop periods may be used. For example, the iteration loop 202 may be executed on a number-of-minutes basis. In FIG. 2, days (d) start at d=0, and increase by 1 for each passing day. Hours (h) start at 0, and increase by 1 for each passing hour, 0 to 23.

The controller 52 monitors TA and records an average ambient temperature for a given hour of a given day ($TA_{d,h}$). Likewise, the controller 52 monitors total current (i.e., $I_{Comp}+I_{Cond}$) and records an average total current for a given hour of a given day ($I_{d,h}$). Other energy consumption indicators, such as total kilowatt-hours, may alternatively be used. The controller 52 modulates and records the TD set-point for a given hour of a given day ($TD_{d,h}$).

The controller 52 begins in step 204. In step 206, the first day of operation, (i.e., d=0), $TD_{d,h}$ for each hour (i.e. h=0 to 23) is initialized to a predetermined initial value. The initial value may be 10 degrees for all hours of the day. The controller 52 then records $TA_{d,h}$ and $I_{d,h}$ for each hour of the day.

In step 208, the second day of operation (i.e., d=1), the controller 52 changes $TD_{d,h}$ for each hour (i.e., h=0 to 23) of the day. The change is for purposes of comparison between the first day and the second day, and may simply comprise incrementing $TD_{d,h}$ by 1 degree for each hour of the day.

Alternatively, the change may comprise decrementing $TD_{d,h}$ by 1 degree for each hour of the day.

By the end of the second day, the controller 52 has recorded a first TD with corresponding ambient temperature and energy consumption data for each hour of the first day, and a second TD with corresponding ambient temperature and energy consumption data for each hour of the second day. The controller 52 can then determine whether the change in TD increased or decreased total energy consumption for each hour of the day. Generally, the controller 52 calculates an amps-per-degree ratio (R) by dividing the total current for a given hour (i.e., $I_{d,h}$) by the average ambient temperature for the given hour (i.e., $TA_{d,h}$). By comparing the amps-per-degree ratio resulting from different TD's, the controller 52 can determine whether a given TD change increased or decreased the amps-per-degree ratio. By controlling TD to minimize the amps-per-degree ratio, the controller 52 optimizes energy consumption of the refrigeration system.

As can be appreciated, other energy consumption indicators may be used in place of amps. In which case, the appropriate energy-temperature ratio is used by the controller 52.

On day 3 (i.e., d=2), the controller 52 enters the iteration loop 202. The loop is executed for each hour of the day. To set the $TD_{d,h}$, the controller 52 compares data from the same hour of the previous 2 days.

In step 210, the controller 52 calculates the amps-per-degree ratio for the same hour of the previous day: $R_{d-1,h} = I_{d-1,h}/TA_{d-1,h}$.

In step 212, the controller 52 calculates the amps-per-degree ratio for the same hour of the day before the previous day: $R_{d-2,h} = I_{d-2,h}/TA_{d-2,h}$.

If the amps-per-degree ratio of the previous day is greater than the amps-per-degree ratio of 2 days ago, then the TD change between the 2 days was in the wrong direction. In other words, the TD change resulted in higher amps-per degree. If, on the other hand, the amps-per-degree ratio of the previous day is less than the amps-per degree ratio of 2 days ago, then the TD change was in the correct direction.

In step 214, the controller 52 calculates a comparison factor (F) according to the formula: $F = (R_{d-1,h} - R_{d-2,h}) \times (TD_{d-1,h} - TD_{d-2,h})$.

Essentially, the controller 52 adjusts the current TD based on whether F is a positive or a negative number. For example, when energy consumption increases, $R_{d-1,h} - R_{d-2,h}$ will be a positive number. When energy consumption decreases, $R_{d-1,h} - R_{d-2,h}$ will be a negative number.

Likewise, when TD was increased, $TD_{d-1,h} - TD_{d-2,h}$ will be a positive number. When TD was decreased, $TD_{d-1,h} - TD_{d-2,h}$ will be a negative number.

Further, when energy consumption increased, and TD was increased, F will be positive, and TD should now be decreased. When energy consumption decreased, and TD decreased, F will be positive, and TD should now be decreased. When energy consumption increased, and TD was decreased, F will be negative, and TD should now be increased. When energy consumption decreased, and TD was increased, F will be negative, and TD should now be increased. Because the sign of F is the crucial information (i.e., whether F is positive or negative), F may also be calculated as a quotient instead of a product.

In step 216, the controller 52 determines whether F is $\geq 0$. When F is not $\geq 0$, TD is decreased in step 218. In step 218, the controller 52 sets $TD_{d,h}$ at $TD_{d-1,h} - x$, where x is an incremental value. In step 218, x may be a predetermined constant, for example 0.5 degrees, or 1.0 degree. Alternatively, x may be a calculated value that decreases over successive iterations of the iteration loop 202.

In step 216, when F is $\geq 0$, TD is increased in step 220. In step 220, the controller 52 sets $TD_{d,h}$ at $TD_{d-1,h} + x$, where x is the incremental value.

In step 221, the controller 52 checks TD against the predetermined maximum and minimum condenser temperatures. If the TD will result in a $T_{Cond}$ outside of the predetermined range, then the TD is adjusted in step 221 so that the resulting $T_{Cond}$ will be within the predetermined range.

After setting $TD_{d,h}$, the controller 52 proceeds to step 222 and records the current $TD_{d,h}$, as well as the $TA_{d,h}$ and $I_{d,h}$ for the hour. At the end of the current hour, the controller 52 proceeds again with step 210 and executes the iteration loop 202 again.

In this way, the controller 52 optimizes the refrigeration system 10 by continually monitoring energy consumption of the refrigeration system 10, continually changing the TD, and continually evaluating the effect of the changed TD on energy consumption. The optimization occurs from day-to-day on an hourly basis, such that data from a given hour of the day is compared with data from the same hour of previous days. The optimization accounts for the load variations throughout the day on the refrigeration system 10.

The optimization also accounts for any sensor inaccuracies that may be present in the system. As can be appreciated, temperature sensors, pressure sensors, and the like, may be inaccurate by some constant amount. For example, a temperature sensor may be inaccurate by 2 or 3 degrees. A traditional system operating at a fixed temperature difference set-point will always operate at a temperature difference set-point that is off by 2 or 3 degrees.

A refrigeration system 10 operated by the controller 52 according to the control algorithm 200 will operate at the most efficient temperature difference set-point, despite the inaccuracies of the temperature sensor. For example, if the most efficient temperature difference set-point is actually 10 degrees, and if the condenser temperature sensor 41 is off by 2 degrees, the controller 52 will find the most efficient temperature difference set-point. To the controller 52, the most efficient temperature difference set-point will appear to be 12 degrees, or 8 degrees, due to the inaccurate condenser temperature sensor 41. But the controller 52 will operate at the most efficient temperature difference set-point nonetheless. Thus, by execution of the control algorithm 200, the controller 52 operates at the optimized temperature difference set-point, despite the inaccurate sensor.

The controller 52 executing the control algorithm 200 may adjust $TD_{d,h}$ within the $T_{Cond}$ maximum range. In such case, the controller 52 may increase or decrease TD according to the control algorithm 200 until the resulting $T_{Cond}$ maximum has been reached.

Figure 3:
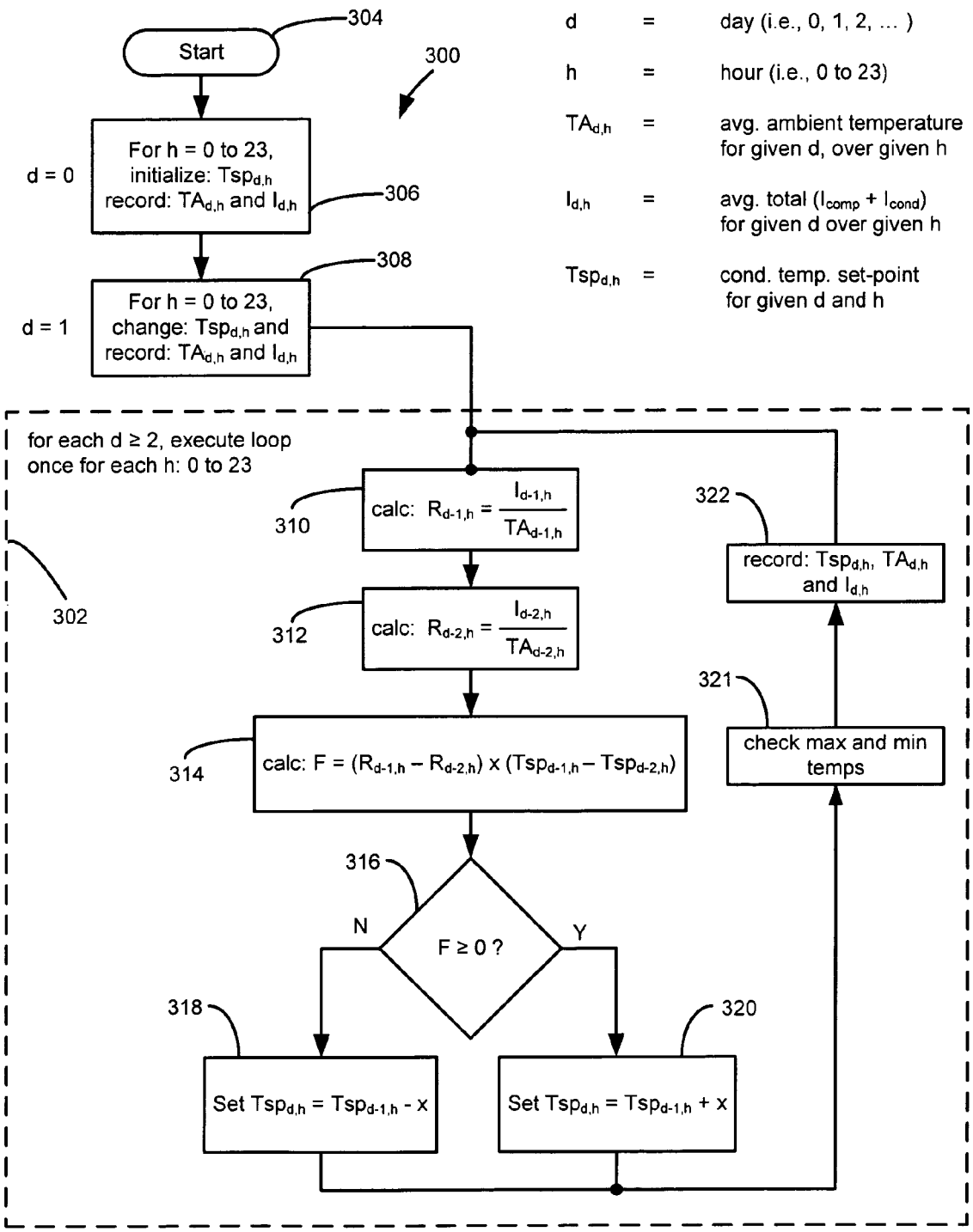
FIG. 3 is a flowchart illustrating a condenser fan control algorithm based on modulating a condenser temperature set-point.

Referring now to FIG. 3, a control algorithm 300 for optimizing condenser fan capacity based on a condenser temperature set-point (Tsp) is executed by the controller 52. The control algorithm 300 is stored on the computer readable medium 53 accessible to the controller 52. The controller 52 begins in step 304. In step 306, the controller 52 initializes the Tsp's, and records $TA_{d,h}$ and $I_{d,h}$ for each hour of the first day. In step 308, the controller 52 changes the Tsp's for each hour of the second day, and records $TA_{d,h}$ and $I_{d,h}$. The controller 52 then enters the iteration loop 302 starting with step 310.

As in the control algorithm 200 for TD, the controller 52 in step 310 calculates the amps-per-degree ratio of the previous day. In step 312 the controller 52 calculates the amps-per-degree ratio of 2 days prior. In step 314, the controller 52 calculates F according to the formula: $F = (R_{d-1,h} - R_{d-2,h}) \times (Tsp_{d-1,h} - Tsp_{d-2,h})$.

In step 316, the controller 52 determines whether F is ≧0. When F is not ≧0, Tsp is decreased in step 318. In step 318, the controller 52 sets $Tsp_{d,h}$ at $Tsp_{d-1,h}$−x, where x is an incremental value.

In step 316, when F is ≧0, Tsp is increased in step 320. In step 320, the controller 52 sets $Tsp_{d,h}$ at $Tsp_{d-1,h}$+X, where x is the incremental value.

In step 321, the controller 52 checks the resulting Tsp against the condenser maximum and minimum temperatures. If the Tsp is outside of the predetermined range, the controller 52 adjusts Tsp to within the predetermined range.

After setting $Tsp_{d,h}$, the controller 52 proceeds to step 322 and records the current $Tsp_{d,h}$, as well as the $TA_{d,h}$ and $I_{d,h}$ for the hour. At the end of the current hour, the controller 52 proceeds again with step 310 and executes the iteration loop 302 again.

In this way, the controller 52 optimizes the refrigeration system 10 by continually monitoring energy consumption of the refrigeration system 10, continually changing the Tsp, and continually evaluating the effect of the changed Tsp on energy consumption.

Figure 4:
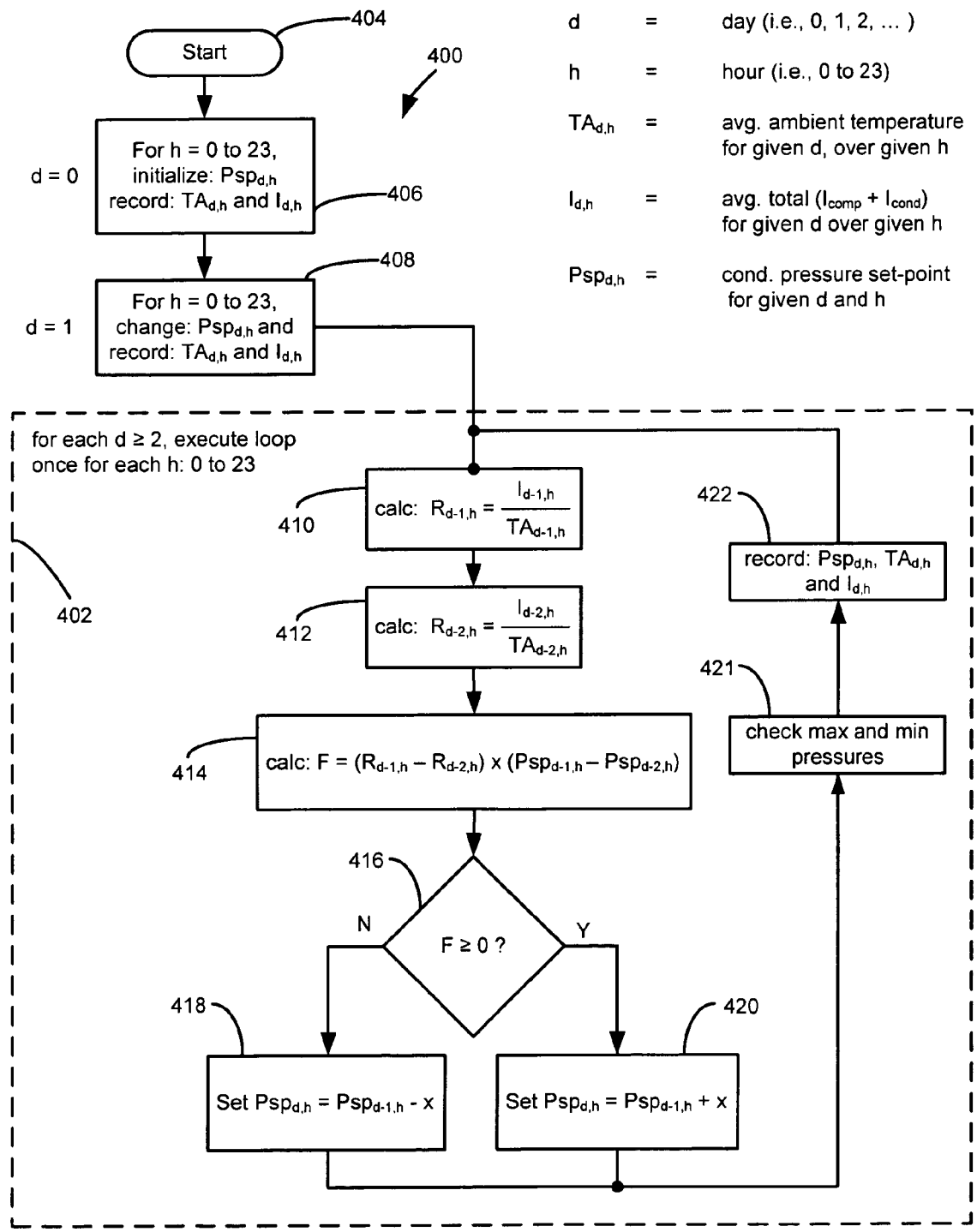
FIG. 4 is a flowchart illustrating a condenser fan control algorithm based on modulating a condenser pressure set-point.

Referring now to FIG. 4, a control algorithm 300 for optimizing condenser fan capacity based on a condenser pressure set-point (Psp) is executed by the controller 52. The control algorithm 400 is stored on the computer readable medium 53 accessible to the controller 52. The controller 52 begins in step 404. In step 406, the controller 52 initializes the Psp's, and records $TA_{d,h}$ and $I_{d,h}$ for each hour of the first day. In step 408, the controller 52 changes the Psp's for each hour of the second day, and records $TA_{d,h}$ and $I_{d,h}$. The controller 52 then enters the iteration loop 402 starting with step 410.

As in the control algorithm 200 for TD, and the control algorithm 300 for Tsp, the controller 52 in step 410 calculates the amps-per-degree ratio of the previous day. In step 412 the controller 52 calculates the amps-per-degree ratio of 2 days prior. In step 414, the controller 52 calculates F according to the formula: $F=(R_{d-1,h}-R_{d-2,h})\times(Psp_{d-1,h}-Psp_{d-2,h})$.

In step 416, the controller 52 determines whether F is ≧0. When F is not ≧0, Psp is decreased in step 418. In step 418, the controller 52 sets $Psp_{d,h}$ at $Psp_{d-1,h}$−x, where x is an incremental value.

In step 416, when F is ≧0, Psp is increased in step 420. In step 420, the controller 52 sets $Psp_{d,h}$ at $Psp_{d-1,h}$+x, where x is the incremental value. In step 421 the controller 52 checks the Psp against the predetermined maximum and minimum condenser operating pressures. If the Psp is outside of the predetermined range, the controller 52 adjusts Psp to within the predetermined range.

After setting $Psp_{d,h}$, the controller 52 proceeds to step 422 and records the current $Psp_{d,h}$, as well as the $TA_{d,h}$ and $I_{d,h}$ for the hour. At the end of the current hour, the controller 52 proceeds again with step 410 and executes the iteration loop 402 again.

In this way, the controller 52 optimizes the refrigeration system 10 by continually monitoring energy consumption of the refrigeration system 10, continually changing the Psp, and continually evaluating the effect of the changed Psp on energy consumption.

Figure 5:
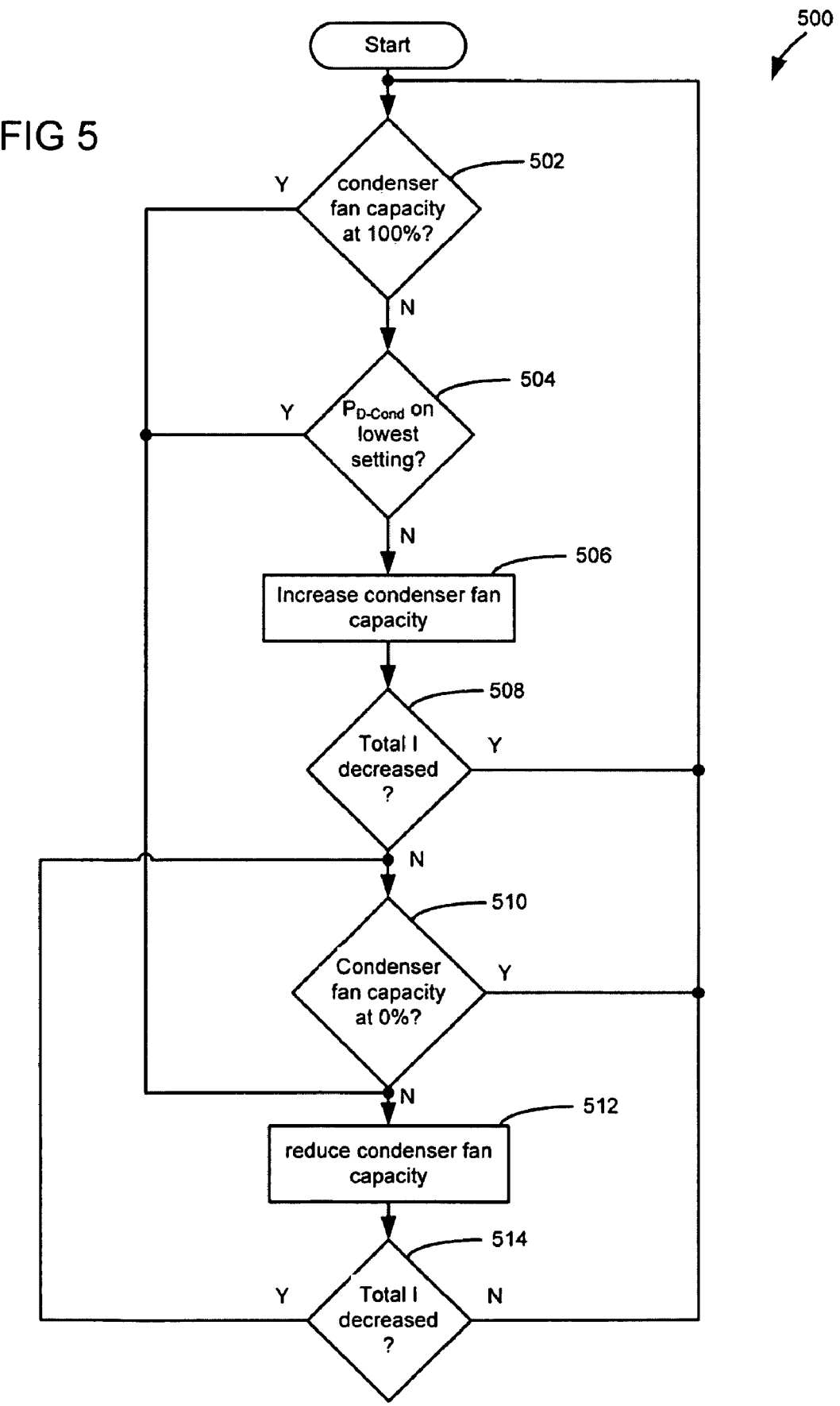
FIG. 5 is a flowchart illustrating a condenser fan control algorithm based on modulating a condenser fan capacity.

Referring now to FIG. 5, a condenser fan control algorithm 500 utilizing a direct control of condenser fan capacity based on power consumption is executed by the controller 52. In step 502, the controller 52 determines if the condenser fan capacity is at 100 percent. When condenser fan capacity is not at 100 percent, the controller 52 proceeds to step 504 and determines whether PD-Cond is at the lowest setting. When $P_{D-Cond}$ is not at the lowest setting, the controller 52 increases condenser fan capacity in step 506 and determines whether the total electrical current (I) decreases in step 508. When I decreases in step 508, the controller 52 loops back to step 502.

In step 508 when I did not decrease, the controller 52 proceeds to step 510 and determines whether condenser fan capacity is at 0 percent. When condenser fan capacity is at 0 percent, the controller 52 loops back to step 502.

In step 502 when condenser fan capacity is at 100 percent, or in step 504 when $P_{D-Cond}$ is at the lowest setting, or in step 510 when condenser fan capacity is not at 0 percent, the controller 52 reduces condenser fan capacity in step 512. In step 514, the controller 52 determines whether I decreased. When I decreased in step 514, the controller 52 loops back to step 510. When I did not decrease, the controller 52 loops back to step 502.

In this way, the controller 52 adjusts condenser fan capacity based on the current energy consumption of the refrigeration system 10. Energy consumption is optimized based on condenser discharge pressure and condenser fan capacity.

The description is merely exemplary in nature and, thus, variations that do not depart from the gist of the teachings are not to be regarded as a departure from the spirit and scope of the teachings.

What is claimed is:

1. A non-transitory computer-readable medium having computer executable instructions for performing a method comprising:
   modulating a condenser set point at predetermined intervals for a predetermined time period;
   monitoring an energy consumption of a compressor and at least one condenser fan of a refrigeration system during each of said intervals;
   recording said energy consumption during each of said intervals;
   recording an average ambient temperature during each of said intervals;
   calculating a ratio of said energy consumption to said average ambient temperature for each of said intervals; and
   comparing said ratios for different intervals to optimize said energy consumption.

2. The method of claim 1 comprising:
   setting a condenser fan capacity to an initial capacity level;
   changing said condenser fan capacity in a first direction;
   monitoring a resulting energy consumption change; and
   changing said condenser fan capacity in a second direction;
   wherein said first and section directions are opposite when said resulting energy consumption change is positive and wherein said first and second direction are identical when said resulting energy consumption change is negative.

3. A controller that executes the method of claim 1.

4. A non-transitory computer-readable medium having computer-executable instructions for performing a method comprising:
   monitoring an energy consumption of a compressor of a refrigeration system;
   monitoring an energy consumption of at least one condenser fan of a condenser of said refrigeration system;
   determining a total energy consumption based on said energy consumption of said compressor and said energy consumption of said at least one condenser fan;
   controlling said at least one condenser fan based on a temperature difference set-point corresponding to a difference between a condenser temperature of said condenser and an ambient temperature; and
   modulating said temperature difference set-point to minimize said total energy consumption.

5. The method of claim 4 further comprising:
setting said temperature difference set-point to an initial value;
recording a first total energy consumption resulting from said initial value;
setting said temperature difference set-point to a different value;
recording a second total energy consumption resulting from said different value;
comparing said first total energy consumption with said second total energy consumption; and
modulating said temperature difference set-point based on said energy consumption comparison.

6. The method of claim 4 further comprising:
setting said temperature difference set-point to an initial value;
recording said total energy consumption and said ambient temperature for each hour of a first day;
calculating energy-temperature ratios for each hour of said first day based on said total energy consumption and said ambient temperature for said each hour of said first day;
setting said temperature difference set-point to a different value;
recording said total energy consumption and said ambient temperature for each hour of a second day;
calculating energy-temperature ratios for each hour of said second day based on said total energy consumption and said ambient temperature for said each hour of said second day;
comparing said energy-temperature ratios for each hour of said first day with said energy-temperature ratios for each hour of said second day; and
modulating said temperature difference set-point for each hour of a third day based on said ratio comparisons.

7. The method of claim 4 further comprising:
setting said temperature difference set-point to an initial value;
changing said temperature difference set-point in an first direction;
monitoring a resulting energy consumption change; and
changing said temperature difference set-point in a second direction;
wherein said first and second directions are opposite when said resulting energy consumption change is positive and wherein said first and second direction are identical when said resulting energy consumption change is negative.

8. The computer-readable medium of claim 4 wherein said computer-readable medium is located remotely from said refrigeration system.

9. A controller that executes the method of claim 4.

* * * * *

UNITED STATES PATENT AND TRADEMARK OFFICE
CERTIFICATE OF CORRECTION

PATENT NO. : 8,051,668 B2
APPLICATION NO. : 11/260877
DATED : November 8, 2011
INVENTOR(S) : Abtar Singh et al.

Page 1 of 1

It is certified that error appears in the above-identified patent and that said Letters Patent is hereby corrected as shown below:

| | |
|---|---|
| Column 5, Line 32 | "PD-Comp" should be --$P_{D\text{-}Comp}$--. |
| Column 9, Line 6 | "+ X" should be --+ x--. |
| Column 9, Line 65 | "PD-Cond" should be --$P_{D\text{-}Cond}$--. |
| Column 12, Line 12 | "an first" should be --a first--. |

Signed and Sealed this
Eighth Day of May, 2012

David J. Kappos
*Director of the United States Patent and Trademark Office*